United States Patent
Cyue

(10) Patent No.: US 11,968,192 B2
(45) Date of Patent: Apr. 23, 2024

(54) NETWORK ENCRYPTION METHOD

(71) Applicant: SIAOBAI INC., Taoyuan (TW)

(72) Inventor: Jheng-Hao Cyue, Taoyuan (TW)

(73) Assignee: SIAOBI INC., Taoyuan (TW)

( * ) Notice: Subject to any disclaimer, the term of this patent is extended or adjusted under 35 U.S.C. 154(b) by 283 days.

(21) Appl. No.: 17/575,684

(22) Filed: Jan. 14, 2022

(65) Prior Publication Data

US 2022/0141204 A1    May 5, 2022

Related U.S. Application Data

(63) Continuation of application No. PCT/CN2019/095933, filed on Jul. 15, 2019.

(51) Int. Cl.
*H04L 29/06* (2006.01)
*H04L 9/40* (2022.01)

(52) U.S. Cl.
CPC ...... *H04L 63/0435* (2013.01); *H04L 63/0846* (2013.01); *H04L 63/0876* (2013.01); *H04L 63/102* (2013.01)

(58) Field of Classification Search
CPC ............. H04L 63/0435; H04L 63/0846; H04L 63/0876; H04L 63/102; H04L 9/08
See application file for complete search history.

(56) References Cited

U.S. PATENT DOCUMENTS

| | | | | |
|---|---|---|---|---|
| 2003/0005299 A1* | 1/2003 | Xia | ........................ | G06F 21/31 713/171 |
| 2019/0116477 A1* | 4/2019 | Bhagwani | ................ | H04W 4/50 |
| 2021/0058412 A1* | 2/2021 | Rowland | ............... | H04L 9/0825 |

FOREIGN PATENT DOCUMENTS

| | | | | |
|---|---|---|---|---|
| CN | 108566276 A | 9/2018 | | |
| CN | 108738106 A | 11/2018 | | |
| CN | 109151010 A | 1/2019 | | |
| WO | WO-2009062373 A1 * | 5/2009 | ......... | H04L 63/0435 |
| WO | WO-2018006610 A1 * | 1/2018 | ............. | H04L 29/06 |

(Continued)

OTHER PUBLICATIONS

Chatterjee et al., "Building PUF Based Authentication and Key Exchange Protocol for IoT Without Explicit CRPs in Verifier Database", IEEE Transactions on Dependable and Secure Computing, vol. 16, No. 3, May/Jun. (Year: 2018).*

(Continued)

*Primary Examiner* — Morshed Mehedi

(74) *Attorney, Agent, or Firm* — Perilla Knox & Hildebrandt LLP; Kenneth A. Knox

(57) ABSTRACT

This invention involves an encryption method that is mainly applied to network. The network could be both wireless or wired, the former is connected through a wireless router, and the latter is connected through a router. When the network receives a message requesting connection from at least one new networking device, it can authenticate and authorize the message through the key to form a fixed connection with the network, and at the same time, at least one connected device to the network can update the password connected to the network synchronously, or at least one connected device connected to the network can update the password connected to the network at any time, so as to improve the performance of network security and avoid hacking.

21 Claims, 5 Drawing Sheets

(56) References Cited

FOREIGN PATENT DOCUMENTS

WO      WO-2020042119 A1 *   3/2020   ........... H04W 48/10

OTHER PUBLICATIONS

International Search Report of PCT/CN2019/095933, dated Apr. 13, 2020.
3GPP TSG SA WG3 (Security) Adhoc Meeting on FS_NSA, S3-161437, Sep. 27-29, 2016, San Diego (US).

* cited by examiner

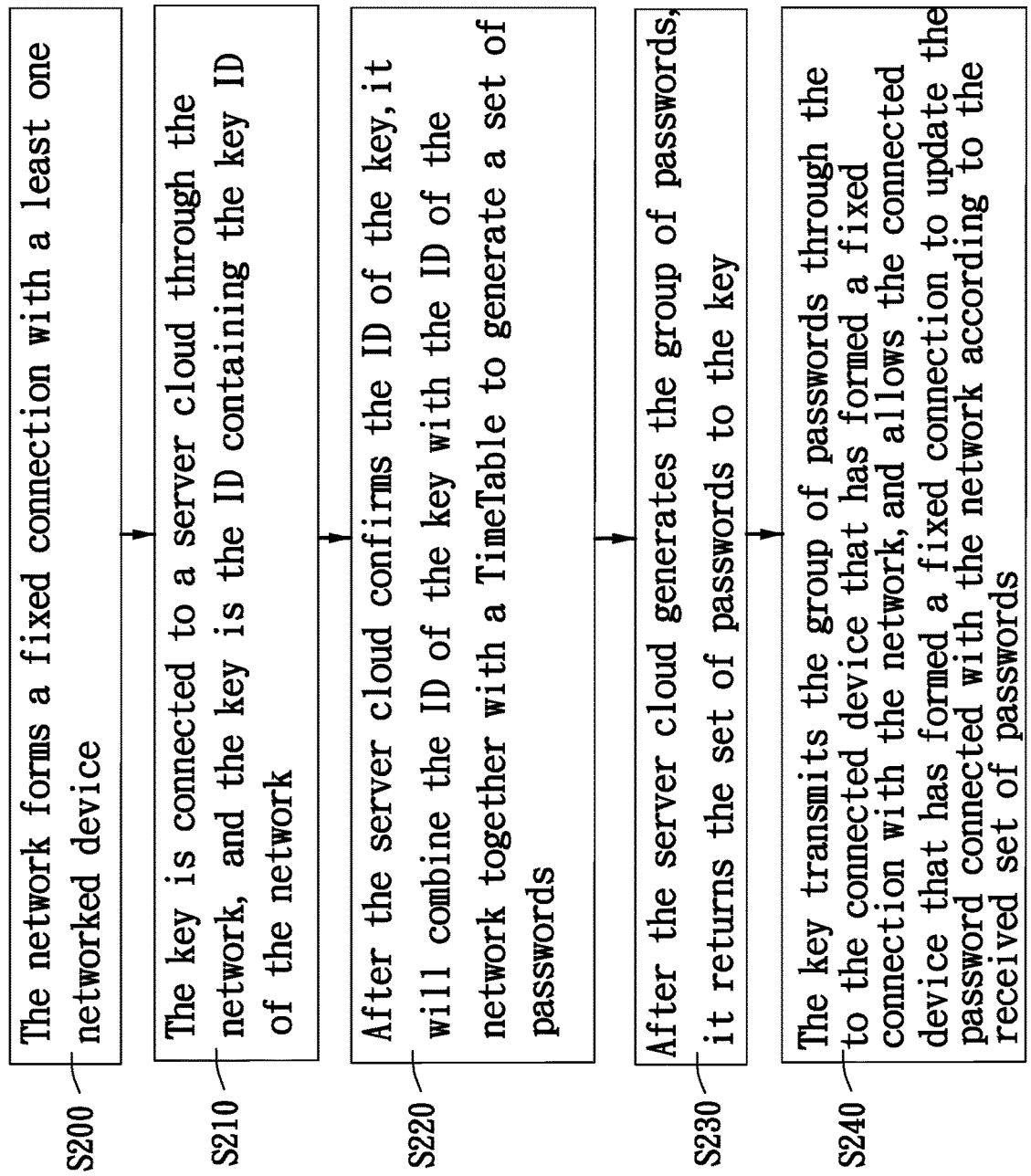

NETWORK ENCRYPTION METHOD

CROSS-REFERENCE TO RELATED PATENT APPLICATION

This application is a continuation application of International Patent Application No. PCT/CN2019/095933, filed on Jul. 15, 2019. The disclosure of the above application is incorporated herein in its entirety by reference.

TECHNICAL FIELD

This invention relates to a network encryption method, in particular to a method that can be used on the Internet of things (IOT) to improve the performance of network security and avoid hacker intrusion, and is suitable for both wired or wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In recent years, with the progress of science and technology, especially the expansion of bandwidth of the network, the world has entered the so-called 5G era, which means faster download and upload rate and many devices that could not be connected to the network before began to have the network connecting function, resulting in the so-called Internet of things (IOT).

Due to the low computing power, many networked devices can only provide very simple application services, and are unlikely to be installed with the so-called defense software or anti-virus software. So, all they rely on is the built-in encryption mechanism to prevent external intrusion.

At present, after hackers invade the Internet of things (IOT), they will turn to attack other systems connected to the Internet of things (IOT). If users use the preset password, hackers can easily break into the system. In serious cases, they may obtain the user's personal data, which is a stepping attack.

Some hacker organizations will publish fake or malicious applications on Google play, and then steal the user's data when the user is unaware of it. Or through many Internets of things (IOT) devices (such as webcams or Wifi Router) to form a botnet to launch DDos attacks.

SUMMARY

This invention aims to provide a encryption method that is mainly applied to network. The network could be both wireless or wired, the former is connected through a wireless router, and the latter is connected through a router. When the network receives a message requesting connection from at least one new networking device, it can authenticate and authorize the message through the key to form a fixed connection with the network, and at the same time, at least one connected device to the network can update the password connected to the network synchronously, or at least one connected device connected to the network can update the password connected to the network at any time, so as to improve the performance of network security and avoid hacking and increase the practicality of the whole network.

Another purpose of this invention is to provide a network encryption method, by which a Key is combined with the network, which is connected to a server cloud through the network. With the server cloud, the key identification code (ID) of the Key and the network identification code (ID) of the network could be connected and added with a TimeTable to generate a group of passwords, which will be transmitted back to the Key, thus to achieve the effect of encryption of the Key and increase the difficulty of the group of passwords, making it difficult for the outside world to know the composition of the group of passwords, meeting the requirements of information security, and then increasing the overall usability.

BRIEF DESCRIPTION OF THE DRAWINGS

The present invention will be described in detail below in conjunction with embodiments and accompanying drawings, in which:

FIG. 5 is a flowchart of steps of the second embodiment of this invention.

DETAILED DESCRIPTION

Please refer to FIGS. 1 to 5 for the schematic diagram of the implementation of the invention, and the best embodiment of the network encryption method of the invention is applied to the network, so that when used in the Internet of things (TOT), it can improve the performance of network security and avoid hacker intrusion.

Figure 1:
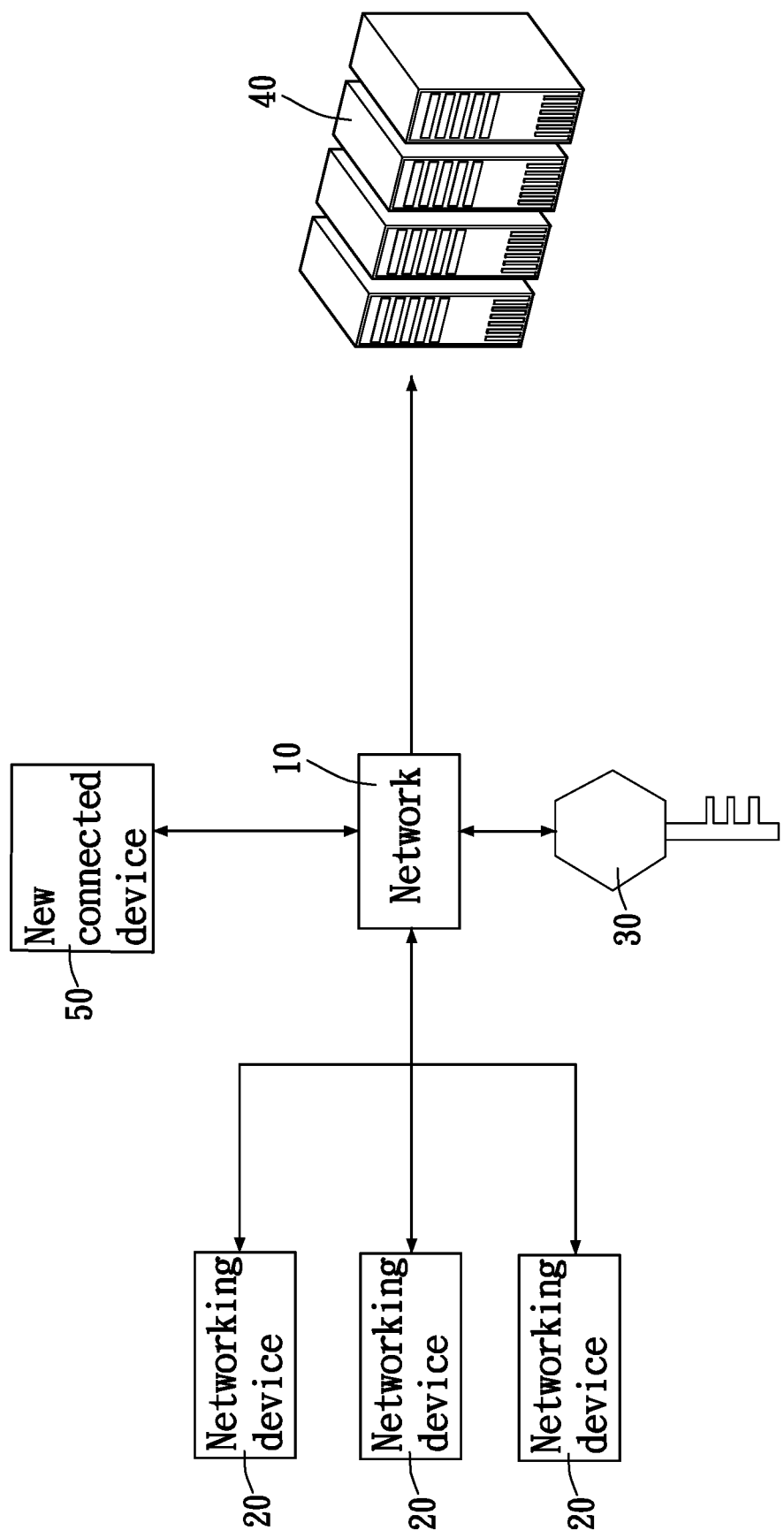
FIG. 1 is an architectural diagram of a first embodiment of this invention.

The first encryption method of this invention is mainly applied to network 10. The network 10 could be both wireless or wired, the former is connected through a wireless router (not shown), and the latter is connected through a router (not shown). The network 10 is combined with a Key 30 (as shown in FIG. 1), and is provided with a network identification code (ID), and the key 30 is also provided with a key ID, wherein the network ID of the network 10 is either the name and password set or the reset name and password of the network 10 at the first installation, and the key ID of key 30 is either the original set serial number or the generated serial number reset via the network 10.

Figure 2:
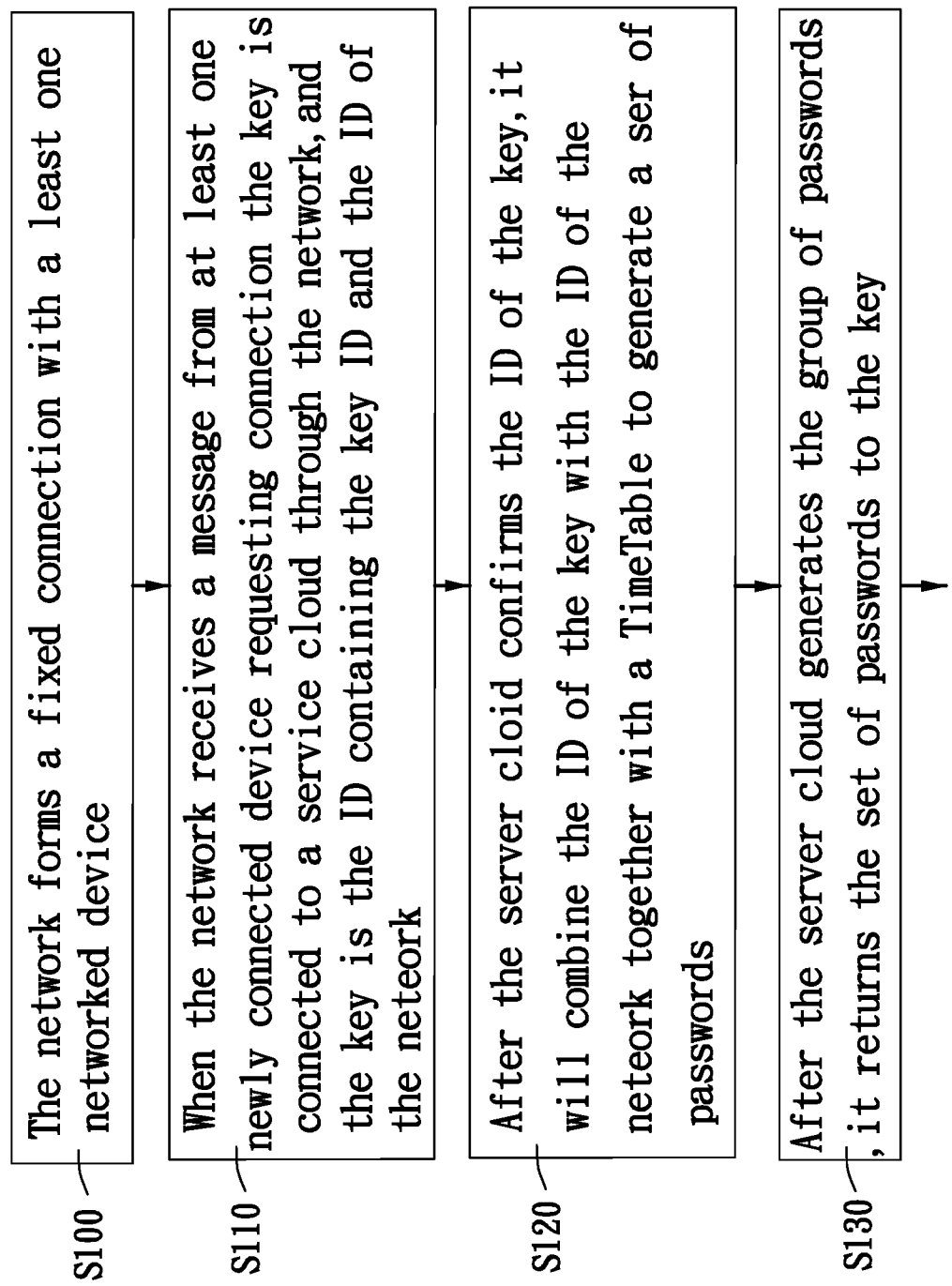
FIG. 2 is a flowchart of steps S100 to S130 according to the first embodiment of this invention.
Figure 3:
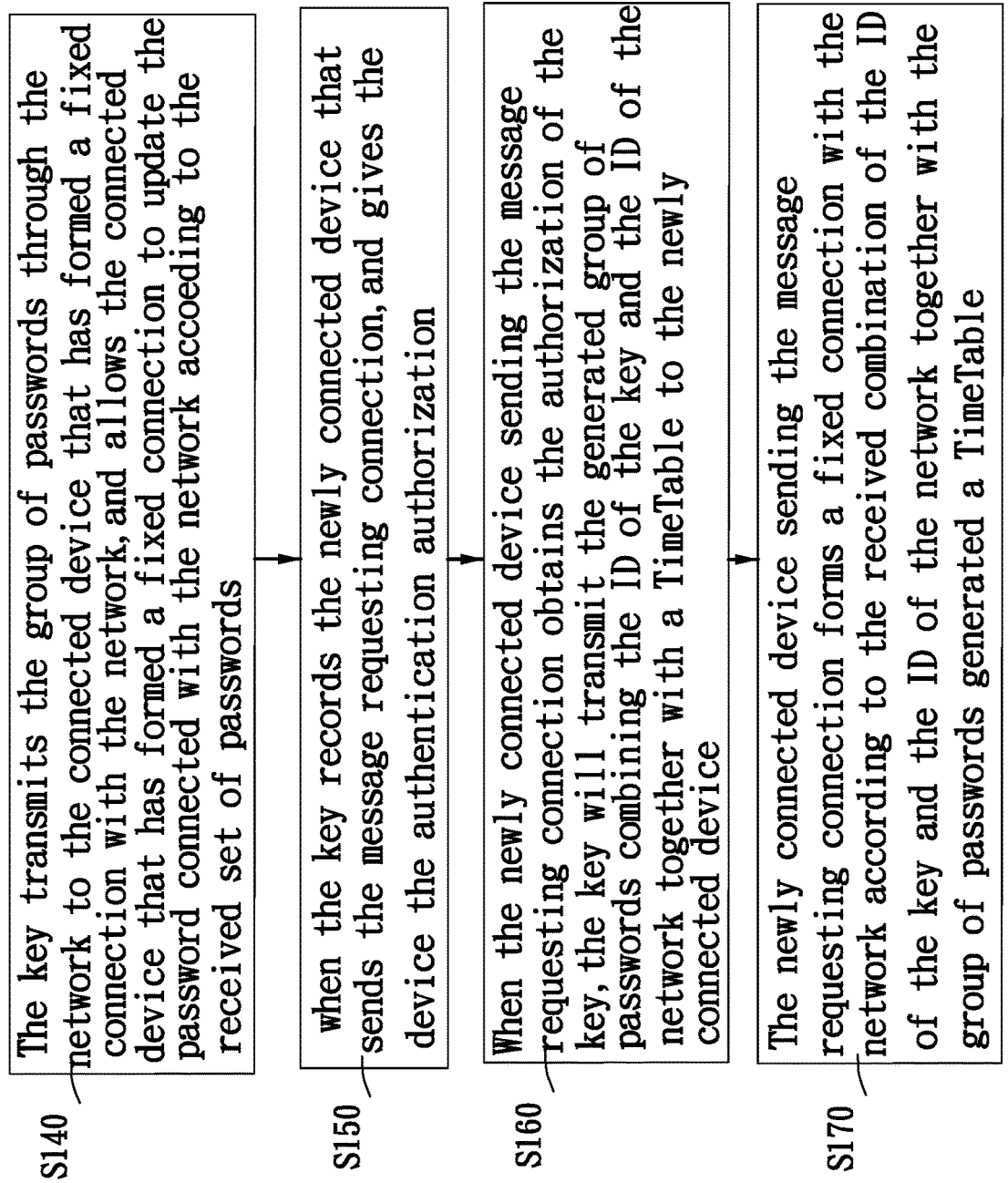
FIG. 3 is a flowchart of steps S140 to S170 according to the first embodiment of this invention.

The main steps of the first execution mode (as shown in FIGS. 2 and 3) include: step S100, the network 10 forms a fixed connection with at least one networked device 20; That networked device 20 and the network 10 have set the connection state first, so that the network 10 could form a fixed connection with that networked device 20, and then the network 10 can control the networked device 20 and carry out various contacts and message transmission. After completing the above step S100, proceed to the next step S110.

The networked device 20 in the above step S100 could be any of intelligent household appliances, intelligent mechanical products, intelligent electronic products, intelligent monitoring products and intelligent power products, for example, a networked refrigerator, a networked TV, a networked environment detection system, a networked robot, a networked electric cookers and networked air conditioners or any products of various sizes, which are equipped with sensors or chips that can be connected with the network 10. The network 10 could be a wireless network or a wired network, and the wireless network is connected through a wireless router, while the wired network is connected through a router, so that the existing general household appliances or electronic products could be controlled or used in different methods.

In addition, in the next step, S110, when the network 10 receives a message requesting connection from at least one newly connected device 50, the key 30 is connected to a server cloud 40 through the network 10, and the key 30 contains the key 30 ID and the ID of the network 10; After the networked device 20 forms a fixed connection with the network 10, when a newly networked device 50 wants to connect with the network 10, the newly networked device 50 will send a message requesting connection to the network 10. When the network 10 receives the message from device 50, the key 30 set in the network 10 will first be connected to a server cloud 40 through the network 10, in which the server cloud 40 is a cloud system set up by the manufacturer or supplier designing the key 30. When the Key 30 is connected with the server cloud 40, the ID of the key 30 and the ID of the network 10 containing within the key 30 allow the server cloud 40 to identify and confirm. After completing the above step S110, proceed to the next step S120.

The networked device 50 in the above step S110 could be any of intelligent household appliances, intelligent mechanical products, intelligent electronic products, intelligent monitoring products and intelligent power products, for example, a networked refrigerator, a networked TV, a networked environment detection system, a networked robot, a networked electric cookers and networked air conditioners or any products of various sizes, which are equipped with sensors or chips that can be connected with the network 10. The network 10 could be a wireless network or a wired network, and the wireless network is connected through a wireless router, while the wired network is connected through a router. In addition, the key 30 is provided with a trigger message from an external controller (not shown) to start the execution steps, or the trigger message can be installed on the network 10 so that the execution steps can be started directly by the network 10.

In addition, in step S120 in the next step, after the server cloud 40 confirms the ID of the key 30, it will combine the ID of the key 30 and the ID of the network 10 and add a TimeTable to generate a set of passwords; When the server cloud 40 receives the key 30 transmitted through the network 10, it will first read the ID of the key 30 contained in the key 30, and then identify and confirm the ID of the key 30 and the ID of the key 30 recorded internally to make sure that the key 30 is already recorded in the server cloud 40. When the server cloud 40 confirms the ID of the key 30, it will combines the ID of the key 30 with the ID of the network 10 and adds a TimeTable to generate a set of passwords. After completing the above step S120, it will be proceed to the next step S130.

In the above step S120, when the Key 30 is connected with the server cloud 40 for the first time, it shall first be registered and let the server cloud 40 record the ID of the key 30, so that the key 30 can be recognized when it reconnects the server cloud 40, so that there is no need to enter the account or password during every connection, thus increasing the speed of quick connection. In addition, the server cloud 40 combines the ID of the key 30 and the ID of the network 10 and adds a time sequence (timetable) to generate a group of passwords, wherein the time sequence (timetable) could be any or any combination of year, month, day, hour, minute and second. For example, the time sequence (timetable) of Oct. 25, 2000 could be 20001025, or 251830 if taking the time 18:30 on the 25th, which makes the group of passwords difficult to figure out by others to increases the complexity of the group of passwords, making it difficult for the outside world to know the composition of the group of passwords, meeting the requirements of information security and enhancing the the effect of encryption of key 30.

In addition, in the next step S130, when the server cloud 40 generates the group of passwords, the server cloud 40 transmits the group of passwords back to the key 30; When the server cloud 40 generates a group of passwords according to the ID of the key 30 and the ID of the network 10 together with a time sequence (timetable), the server cloud 40 transmits the group of passwords back to the key 30 so that the key 30 has a group of passwords containing a time sequence (timetable). Except that the ID of the key 30 and the ID of the network 10 remain unchanged, the timetable of the group of passwords will change due to the different connection time with the server cloud 40. After completing the above step S130, it will be proceed to the next step S140.

In addition, the next step is step S140, and the key transmits the set of passwords to networked device 20 that has formed a fixed connection with the network 10 through the network 10, and allows the networked device 20 that has formed a fixed connection to update the password connected with the network 10 according to the received group of passwords; After the key 30 receives the group of passwords returned, as it is different from the passwords of the device 20 that has formed a fixed connection with the network 10, the key 30 transmits the group of passwords to device 20 connected with the network 10 through the network 10, so as to allow the device 20 that has formed a fixed connection to update the password connected to the network 10 according to the received group of passwords, so that the device 20 can continue to connect with the network 10. In this way, it is not necessary for every device 20 to manually reset the password for connecting to the network 10, providing the efficiency of fast connection and a large and fast update of group passwords at one time. After completing the above step S140, it will be proceed to the next step S150.

In addition, in step S150 in the next step, the key 30 connects with at least one newly connected device 50 that sends the message requesting connection, and authenticates the ID of the newly connected device 50; When the key 30 updates the group of password of device 20 that has formed a fixed connection with the network 10, the key 30 is connected with the newly networked device 50 that sends the message requesting connection to make the key 30 can authenticate the identity of the newly connected device 50, so that the key 30 can record the newly connected device 50 that sends the message requesting connection. After completing the above step S150, it will be proceed to the next step S160.

In the above step S150, the key 30 connects with the newly connected device 50 that sends the message requesting connection, and authenticates the identity of the device 50 that sends the message requesting connection. The authentication is that the newly connected device 50 sending the message requesting connection sends an identity code (ID) to the key 30 for the first time, so that the key 30 can record the identity code (ID) of it, which is either the original serial number or the serial number generated by resetting.

In addition, in next step S160, when the newly connected device 50 sending the message requesting connection obtains the authorization of the key 30, the key 30 will transmit the generated group of passwords combining the ID of the key 30 and the ID of the network 10 together with a TimeTable to the newly connected device 50; When the key 30 records the newly connected device 50 that sends the message requesting connection, the device 50 that sends the message requesting connection could obtain the authentication authorization of the key 30. While giving the authentication and authorization, the key 30 transmits the group of passwords generated by the combination of the ID of the key 30 and the ID of the network 10 together with a TimeTable to the newly connected device 50 that sends the message requesting connection, so that the device 50 could has a group password that can be connected to the network 10. After completing the above step S160, it will be proceed to the next step S170.

In addition, in the next step S170, at least one newly connected device 50 that sends the message requesting connection forms a fixed connection with the network 10 according to the received combination of the ID of the key 30 and the ID of the network 10 together with the set of passwords generated by the timetable; When the device 50 sending the message requesting connection receives the group password transmitted by the key 30, it forms a fixed connection with the network 10 according to the group of password generated by the combination of the ID of the key 30 and the ID of the network 10 together with a TimeTable, so as to enable the newly networked device 50 to become a device 20 that has formed a fixed connection with the network 10.

With the steps above, when the network 10 receives a message requesting connection from the new networking device 50, it can authenticate and authorize the message through the key 30 to form a fixed connection with the network, and at the same time, at the device 20 that has connected to the network can update the password connected to the network 10 synchronously, so as to improve the performance of network security and avoid hacking.

Figure 4:
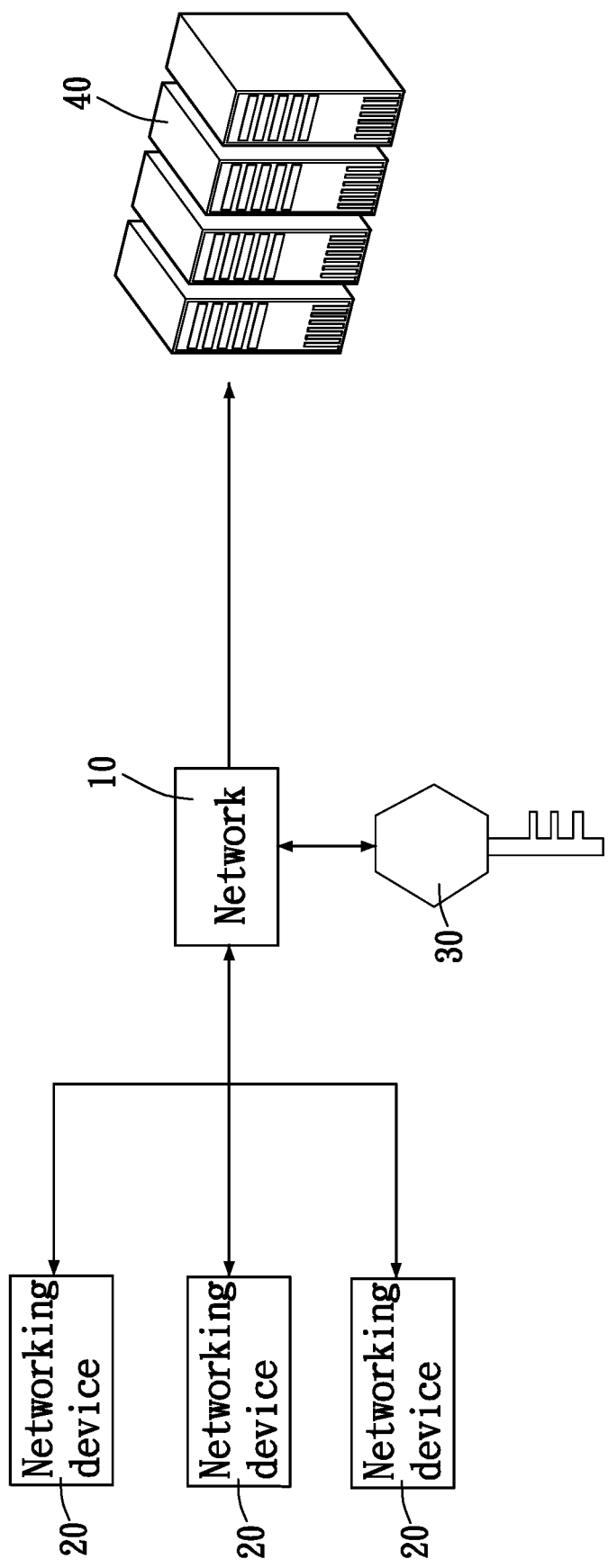
FIG. 4 is an architectural diagram of a second embodiment of this invention.

The second encryption method of this invention is mainly applied to network 10. The network 10 could be both wireless or wired, the former is connected through a wireless router (not shown), and the latter is connected through a router (not shown). The network 10 is combined with a Key 30 (as shown in FIG. 4), and is provided with an ID, and the key 30 is also provided with an ID, wherein the ID of the network 10 is either the name and password set or the reset name and password of the network 10 at the first installation, and the ID of key 30 is either the original set serial number or the generated serial number reset via the network 10.

The main steps of the second execution mode (as shown in FIG. 5) include: step S200, the network 10 forms a fixed connection with at least one networked device 20; That networked device 20 and the network 10 have set the connection state first, so that the network 10 could form a fixed connection with that networked device 20, and then the network 10 can control the networked device 20 and carry out various contacts and message transmission. After completing the above step S200, it will be proceed to the next step S210.

The networked device 20 in the above step S200 could be any of intelligent household appliances, intelligent mechanical products, intelligent electronic products, intelligent monitoring products and intelligent power products, for example, a networked refrigerator, a networked TV, a networked environment detection system, a networked robot, a networked electric cookers and networked air conditioners or any products of various sizes, which are equipped with sensors or chips that can be connected with the network 10. The network 10 could be a wireless network or a wired network, and the wireless network is connected through a wireless router, while the wired network is connected through a router, so that the existing general household appliances or electronic products could be controlled or used in different methods.

In addition, in the next step S210, the key 30 is connected to a server cloud 40 through the network 10, and it contains its own ID and the ID of the network 10; After the networked device 20 forms a fixed connection with the network 10, when it is necessary to update the password, it is connected to a server cloud 40 through the key 30 set in the network 10, in which the server cloud 40 is a cloud system set up by manufacturers or suppliers setting the Key 30. When the Key 30 is connected with the server cloud 40, the ID of the key 30 and the ID of the network 10 containing within the key 30 allow the server cloud 40 to identify and confirm. After completing the above step S210, it will be proceed to the next step S220.

In addition, in step S220 in the next step, after the server cloud 40 confirms the ID of the key 30, it will combine the ID of the key 30 and the ID of the network 10 and add a TimeTable to generate a set of passwords; When the server cloud 40 receives the key 30 transmitted through the network 10, it will first read the ID of the key 30 contained in the key 30, and then identify and confirm the ID of the key 30 and the ID of the key 30 recorded internally to make sure that the key 30 is already recorded in the server cloud 40. When the server cloud 40 confirms the ID of the key 30, it will combines the ID of the key 30 with the ID of the network 10 and adds a TimeTable to generate a set of passwords. After completing the above step S220, it will be proceed to the next step S230.

In the above step S220, when the Key 30 is connected with the server cloud 40 for the first time, it shall first be registered and let the server cloud 40 record the ID of the key 30, so that the key 30 can be recognized when it reconnects the server cloud 40, so that there is no need to enter the account or password during every connection, thus increasing the speed of quick connection. In addition, the server cloud 40 combines the ID of the key 30 and the ID of the network 10 and adds a time sequence (timetable) to generate a group of passwords, wherein the time sequence (timetable) could be any or any combination of year, month, day, hour, minute and second. For example, the time sequence (timetable) of Oct. 25, 2000 could be 20001025, or 251830 if taking the time 18:30 on the 25th, which makes the group of passwords difficult to figure out by others to increases the complexity of the group of passwords, making it difficult for the outside world to know the composition of the group of passwords, meeting the requirements of information security and enhancing the the effect of encryption of the Key.

In addition, in the next step S230, when the server cloud 40 generates the group of passwords, the server cloud 40 transmits the group of passwords back to the key 30; When the server cloud 40 generates a group of passwords according to the ID of the key 30 and the ID of the network 10 together with a time sequence (timetable), the server cloud 40 transmits the group of passwords back to the key 30 so that the key 30 has a group of passwords containing a time sequence (timetable). Except that the ID of the key 30 and the ID of the network 10 remain unchanged, the timetable of the group of passwords will change due to the different connection time with the server cloud 40. After completing the above step S230, it will be proceed to the next step S240.

The next step is step S240, and the key 30 transmits the set of passwords to networked device 20 that has formed a fixed connection with the network 10 through the network 10, and allows the networked device 20 that has formed a fixed connection to update the password connected with the network 10 according to the received group of passwords; After the key 30 receives the group of passwords returned, as it is different from the passwords of the device 20 that has formed a fixed connection with the network 10, the key 30 transmits the group of passwords to device 20 connected with the network 10 through the network 10, so as to allow the device 20 that has formed a fixed connection to update the password connected to the network 10 according to the received group of passwords, so that the device 20 can continue to connect with the network 10. In this way, it is not necessary for every device 20 to manually reset the password for connecting to the network 10, providing the efficiency of fast connection and a large and fast update of group passwords at one time.

Through the above steps, the connected device 20 connected to the network 10 can update the password connected to the network 10 at any time, so as to improve the performance of network security and avoid hacker intrusion.

What is claimed is:

1. An encryption method applied to a network, the network being combined with a key and provided with a network ID while the key is provided with a key ID, and the encryption method including:
   forming a fixed connection of the network with at least one networked device;
   connecting the key to a server cloud through the network, wherein the key contains the key ID of the key and the network ID of the network;
   after the server cloud confirms the key ID of the key, combining, by the server cloud, the key ID of the key with the network ID of the network together with a TimeTable to generate a set of passwords;
   after the server cloud generates the set of passwords, returning, by the server cloud, the set of passwords to the key; and
   transmitting, by the key, the set of passwords through the network to the connected networked device that has formed the fixed connection with the network, thus allowing the connected networked device that has formed the fixed connection to update the password connected with the network according to the received set of passwords.

2. The network encryption method described in claim 1, wherein when the key is further connected with the server cloud for a first time, the key is registered first to let the server cloud record the key ID.

3. The network encryption method described in claim 1, wherein the key is set up with a trigger message from an external controller to start execution steps.

4. The network encryption method described in claim 1, wherein the networked device is selected from a group consisting of an intelligent household appliance, an intelligent mechanical product, an intelligent electronic product, an intelligent monitoring product and an intelligent power supply product.

5. The network encryption method described in claim 1, wherein the network ID of the network is either name and password of the network being set at a first installation or the name and password of the network being reset.

6. The network encryption method described in claim 1, wherein the key ID of the key is either a serial number being originally set or the serial number being reset through the network.

7. The network encryption method described in claim 1, wherein the TimeTable is formed by one or a combination of year, month, day, hour, minute and second.

8. The network encryption method described in claim 1, wherein the network is a wireless network connected with a Wifi router.

9. The network encryption method according to claim 1, wherein the network is a wired network connected with a router.

10. An encryption method applied to a network, the network being combined with a key and provided with a network ID and the key is provided with a key ID, and the encryption method including:
    forming a fixed connection of the network with at least one networked device;
    when the network receives a message from at least one newly connected device requesting connection, connecting the key to a server cloud through the network, wherein the key contains the key ID of the key and the network ID of the network;
    after the server cloud confirms the key ID of the key, combining, by the server cloud, the key ID of the key with the network ID of the network together with a TimeTable to generate a set of passwords;
    after the server cloud generates the set of passwords, returning, by the server cloud, the set of passwords to the key;
    transmitting, by the key, the set of passwords through the network to the connected networked device that has formed the fixed connection with the network, thus allowing the connected networked device that has formed the fixed connection to update the password connected with the network according to the received set of passwords;
    connecting, by the key, the newly connected device that sends the message requesting the connection, giving the newly connected device an authentication authorization;
    when the newly connected device sending the message requesting connection obtains the authorization of the key, transmitting, by the key, the generated set of passwords combining the key ID of the key and the network ID of the network together with the TimeTable to the newly connected device; and
    forming, by the newly connected device sending the message requesting connection, the fixed connection with the network according to the received combination of the key ID of the key and the network ID of the network together with the set of passwords generated by the TimeTable.

11. The network encryption method described in claim 10, wherein when the key is further connected with the server cloud for a first time, the key is registered first to let the server cloud record the key ID.

12. The network encryption method described in claim 10, wherein the key is set up with a trigger message from an external controller to start execution steps.

13. The network encryption method described in claim 10, wherein the networked device is selected from a group consisting of an intelligent household appliance, an intelligent mechanical product, an intelligent electronic product, an intelligent monitoring product and an intelligent power supply product.

14. The network encryption method described in claim 10, wherein the newly connected device is selected from a group consisting of an intelligent household appliance, an intelligent mechanical product, an intelligent electronic product, an intelligent monitoring product and an intelligent power supply product.

15. The network encryption method described in claim 10, wherein the network ID of the network is either name and password of the network being set at a first installation or the name and password of the network being reset.

16. The network encryption method described in claim 10, wherein the key ID of the key is either a serial number being originally set or the serial number being reset through the network.

17. The network encryption method described in claim 10, wherein in the step of connecting, by the key, the newly connected device that sends the message requesting the connection and giving the newly connected device the authentication authorization, the authentication is performed by issuing, by the newly connected device sending the message requesting the connection, an identity code to the key at a first time, so that the key records the identity code of the newly connected device that sends the message requesting the connection.

18. The network encryption method according to claim 17, wherein the identity code is either a serial number being originally set or the serial number being reset.

19. The network encryption method described in claim 10, wherein the TimeTable is formed by one or a combination of year, month, day, hour, minute and second.

20. The network encryption method described in claim 10, wherein the network is a wireless network connected with a Wifi router.

21. The network encryption method according to claim 10, wherein the network is a wired network connected with a router.

* * * * *